United States Patent
Okuda et al.

(10) Patent No.: US 12,241,535 B2
(45) Date of Patent: Mar. 4, 2025

(54) POWER TRANSMISSION DEVICE

(71) Applicant: TOYOTA JIDOSHA KABUSHIKI KAISHA, Toyota (JP)

(72) Inventors: Koichi Okuda, Toyota (JP); Naoki Itazu, Nagoya (JP); Shinichiro Ishikawa, Toyota (JP); Masaya Michishita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/205,616

(22) Filed: Jun. 5, 2023

(65) Prior Publication Data

US 2024/0011548 A1 Jan. 11, 2024

(30) Foreign Application Priority Data

Jul. 11, 2022 (JP) .................... 2022-111138

(51) Int. Cl.
*F16H 48/26* (2006.01)
*B60K 1/02* (2006.01)
*F16D 1/06* (2006.01)
*F16D 35/00* (2006.01)

(52) U.S. Cl.
CPC .............. *F16H 48/26* (2013.01); *B60K 1/02* (2013.01); *F16D 1/06* (2013.01); *F16D 35/00* (2013.01)

(58) Field of Classification Search
CPC ... F16H 48/26; B60K 1/02; F16D 1/06; F16D 35/00

USPC .......................................................... 74/650
See application file for complete search history.

(56) References Cited

U.S. PATENT DOCUMENTS

| | | | | |
|---|---|---|---|---|
| 5,419,406 A | * | 5/1995 | Kawamoto | B60K 1/02 475/5 |
| 11,772,477 B2 | * | 10/2023 | Shibata | B60K 6/445 475/5 |
| 2017/0182884 A1 | * | 6/2017 | Jeong | B60K 1/02 |
| 2018/0298994 A1 | * | 10/2018 | Lian | B60K 6/387 |

FOREIGN PATENT DOCUMENTS

| | | |
|---|---|---|
| JP | 03-234930 A | 10/1991 |
| JP | H11-051153 A | 2/1993 |
| JP | 2008-283836 A | 11/2008 |
| JP | 2021-098460 A | 7/2021 |

* cited by examiner

*Primary Examiner* — Ha Dinh Ho
(74) *Attorney, Agent, or Firm* — Sughrue Mion, PLLC (57) ABSTRACT

A power transmission device according to an aspect of the present disclosure includes a first drive unit having a first drive source, a first transmission connected to the first drive source and the driving force to be transmitted, a second drive source, and a second transmission connected to the second drive source and the driving force to be transmitted, and includes a second drive unit arranged in parallel with the first drive unit, and a frictional differential limiting element disposed between the first transmission and the second transmission and limiting a differential between the rotational drive of the first transmission and the rotational drive of the second transmission.

4 Claims, 7 Drawing Sheets

POWER TRANSMISSION DEVICE

CROSS-REFERENCE TO RELATED APPLICATION

This application claims priority to Japanese Patent Application No. 2022-111138 filed on Jul. 11, 2022, incorporated herein by reference in its entirety.

BACKGROUND

1. Technical Field

The present disclosure relates to a power transmission device.

2. Description of Related Art

Japanese Unexamined Patent Application Publication No. 2008-283836 (JP 2008-283836 A) discloses a power transmission device including a first drive source, a first differential gear connected to the first drive source such that a drive force is transmitted, a second drive source, a second differential gear connected to the second drive source such that a drive force is transmitted, and a differential limiting element connecting the first differential gear and the second differential gear.

The differential limiting element is provided with a differential gear including a first side gear fixed to a first connecting shaft connected to the first differential gear, a second side gear fixed to a second connecting shaft connected to the second differential gear, and a pinion gear meshed with the first side gear and the second side gear. The differential limiting element is configured to adjust the differential between the first connecting shaft and the second connecting shaft by a drive force of a motor connected to the pinion gear.

SUMMARY

The present applicant has found the following problems. The power transmission device of JP 2008-283836 A has a problem of an increase in the size, since the differential limiting element is constituted by a differential gear.

The present disclosure has been made in view of such a problem, and realizes downsizing of a power transmission device.

A power transmission device according to an aspect of the present disclosure includes:
  a first drive unit that includes a first drive source and a first transmission connected to the first drive source such that a drive force is transmitted;
  a second drive unit that includes a second drive source and a second transmission connected to the second drive source such that a drive force is transmitted, and that is arranged in parallel with the first drive unit; and
  a first frictional differential limiting element that is disposed between the first transmission and the second transmission and that limits a differential between a rotational drive of the first transmission and a rotational drive of the second transmission.

In the above-described power transmission device, the first frictional differential limiting element may include a viscous coupling.

In the above-described power transmission device, the first frictional differential limiting element may include a first clutch plate connected to a first connecting shaft such that a drive force is transmitted, the first connecting shaft being connected such that a drive force is transmitted between the first transmission and the first frictional differential limiting element; and
a second clutch plate connected to a second connecting shaft such that a drive force is transmitted, the second connecting shaft being connected such that a drive force is transmitted between the second transmission and the first frictional differential limiting element.

In the above-described power transmission device, the first frictional differential limiting element may change a contact force between the first clutch plate and the second clutch plate, based on an axial force acting on the first connecting shaft.

The above-described power transmission device may include: a first protruding portion provided on a gear of the first transmission; and a second protruding portion that is provided on the first connecting shaft, that comes into contact with the first protruding portion and transmits a drive force of the gear to the first connecting shaft when the gear rotates,
  in which a contact surface between the first protruding portion and the second protruding portion when the gear rotates to one side may include an inclined surface inclined to a side of a rotation direction of the gear to the one side as the inclined surface extends toward a side of the first drive unit in an axial direction of the first connecting shaft.

In the above-described power transmission device, a contact surface between the first protruding portion and the second protruding portion when the gear rotates to another side may include a surface parallel to the axial direction of the first connecting shaft.

In the above-described power transmission device, a contact force between the first clutch plate and the second clutch plate may vary based on a pressure of a pressure medium supplied to the first frictional differential limiting element.

The above-described power transmission device, may further include a second frictional differential limiting element disposed at a place that is between the first transmission and the second transmission and that is different from a place of the first frictional differential limiting element, in which the second frictional differential limiting element limits the differential between the rotational drive of the first transmission and the rotational drive of the second transmission.

According to the present disclosure, it is possible to realize downsizing of a power transmission device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments to which the present disclosure is applied will be described in detail with reference to the drawings. However, the present disclosure is not limited to the following embodiments. Further, for clarity of explanation, the following description and the drawings are simplified as appropriate.

1. First Embodiment

Figure 1:
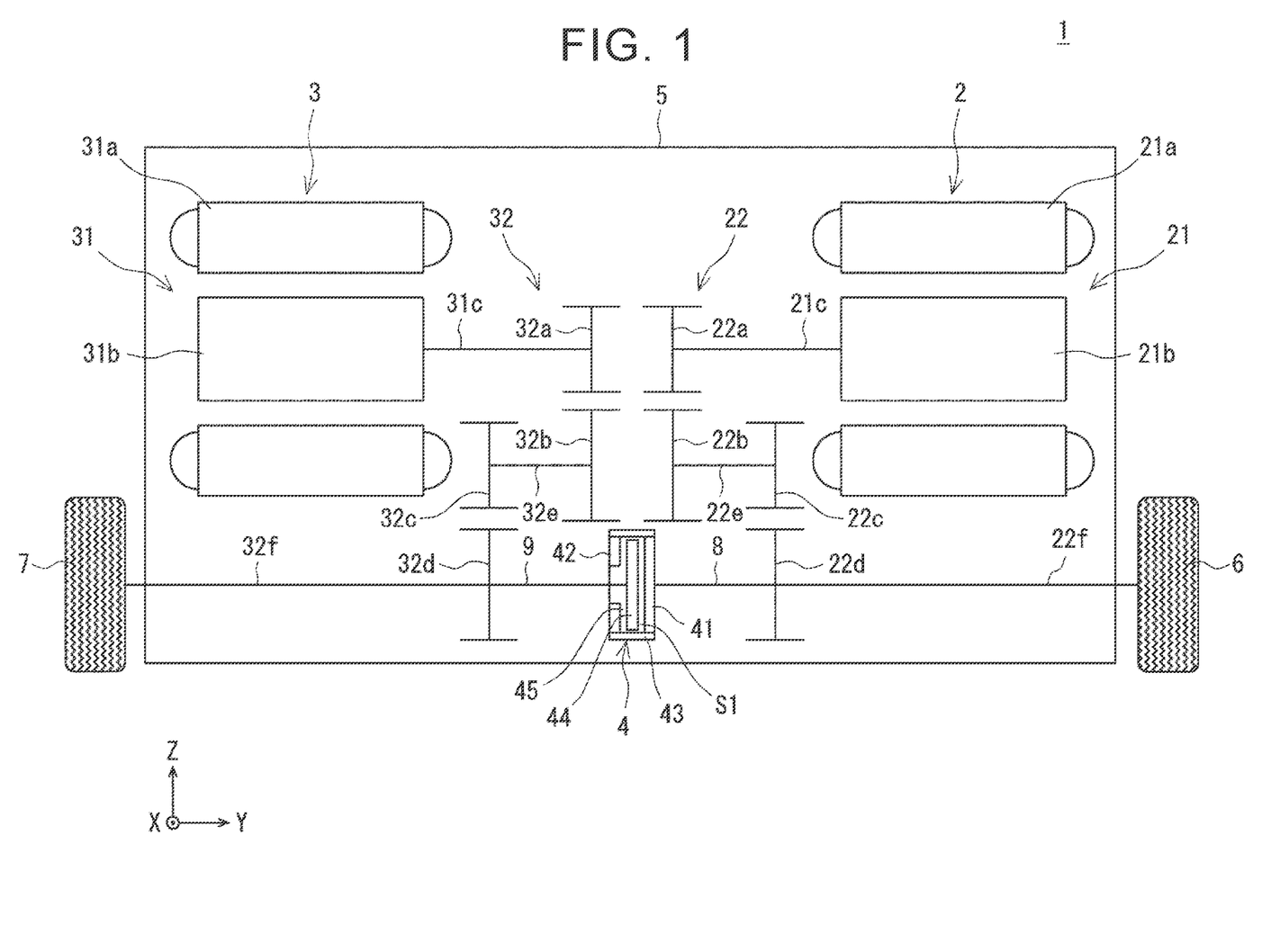
FIG. 1 is a diagram illustrating a power transmission device according to a first embodiment.

First, the configuration of the power transmission device of the present embodiment will be described. The power transmission device of the present embodiment is suitable, for example, as a power transmission device of a vehicle. FIG. 1 is a diagram illustrating a power transmission device according to the present embodiment. In the following description, a three-dimensional (XYZ) coordinate system is used for clarity of description.

As shown in FIG. 1, the power transmission device 1 includes a first drive unit 2, a second drive unit 3, and a frictional differential limiting element 4. The first drive unit 2, the second drive unit 3 and the frictional differential limiting element 4 are accommodated in the housing 5.

As shown in FIG. 1, the first drive unit 2 includes a first drive source 21 and a first transmission 22. The first drive source 21 is, for example, a motor. That is, the first drive source 21 includes a stator 21a and a rotor 21b. However, the first drive source 21 is not limited to a motor, and may be a drive source such as an internal combustion engine.

As shown in FIG. 1, the first transmission 22 includes a first gear 22a, a second gear 22b, a third gear 22c, and a fourth gear 22d. The first gear 22a is connected to the rotary shaft 21c of the rotor 21b of the first drive source 21 so that the driving force can be transmitted. The first gear 22a rotates about the Y-axis.

As shown in FIG. 1, the second gear 22b is meshed with the first gear 22a and rotates about the Y-axis. The third gear 22c is connected to the second gear 22b via a connecting shaft 22e extending in the Y-axis direction and rotates about the Y-axis so that a driving force can be transmitted. The fourth gear 22d is meshed with the third gear 22c and rotates about the Y-axis. The fourth gear 22d is connected to the wheel 6 on the Y-axis+-side via the connecting shaft 22f so that the driving force can be transmitted.

As shown in FIG. 1, the second drive unit 3 is arranged in parallel with the first drive unit 2 in the Y-axis direction. The second drive unit 3 has a line-symmetrical configuration with respect to the first drive unit 2 with an axis extending in the Z-axis direction as a symmetry axis. Therefore, although detailed description is omitted, the second drive unit 3 includes the second drive source 31 and the second transmission 32. The second drive source 31 includes, for example, a stator 31a and a rotor 31b.

As shown in FIG. 1, the second transmission 32 includes a first gear 32a connected so that a rotational shaft 31c and a driving force of the rotor 31b in the second drive source 31 are transmitted, a second gear 32b meshed with the first gear 32a, a third gear 32c connected so that a driving force is transmitted to the second gear 32b via the connecting shaft 32e, and a fourth gear 32d meshed with the third gear 32c. The fourth gear 32d is connected to the wheel 7 on the Y-axis-side via the connecting shaft 32f so that the driving force can be transmitted.

The frictional differential limiting element 4 limits the differential between the rotational drive of the fourth gear 22d of the first transmission 22 and the rotational drive of the fourth gear 32d of the second transmission 32, i.e. between the wheels 6 and the wheels 7. As shown in FIG. 1, the frictional differential limiting element 4 is disposed between the first transmission 22 and the second transmission 32.

The frictional differential limiting element 4 comprises, for example, a viscous coupling. The frictional differential limiting element 4 includes, for example, as shown in FIG. 1, a first clutch plate 41, a second clutch plate 42, a cylindrical portion 43, a third clutch plate 44, and a filler 45.

As shown in FIG. 1, the first clutch plate 41 is, for example, a disk-shaped plate that is substantially parallel to XZ plane. The first clutch plate 41 is connected to the fourth gear 22d of the first transmission 22 via the connecting shaft 8 so that the driving force can be transmitted. The second clutch plate 42 has, for example, an annular plate shape substantially parallel to XZ plane. The second clutch plate 42 is disposed on the Y-axis-side with respect to the first clutch plate 41.

The cylindrical portion 43 has, for example, a cylindrical shape extending in the Y-axis direction as shown in FIG. 1. A peripheral edge portion of the first clutch plate 41 is fixed to an end portion of the cylindrical portion 43 on the Y-axis+side. An outer peripheral edge portion of the second clutch plate 42 is fixed to an end portion of the cylindrical portion 43 on the Y-axis-side. Therefore, the first clutch plate 41 and the second clutch plate 42 rotate as the connecting shaft 8 rotates.

The third clutch plate 44 has, for example, a disk shape substantially parallel to XZ plane, as shown in FIG. 1, and is disposed between the first clutch plate 41 and the second clutch plate 42. The third clutch plate 44 is connected to the fourth gear 32d of the second transmission 32 via the connecting shaft 9 so that the driving force can be transmitted.

At this time, the connecting shaft 9 is passed through the hollow portion of the second clutch plate 42. A space S1 surrounded by the first clutch plate 41, the cylindrical portion 43, and the second clutch plate 42 is a substantially sealed space.

The filler 45 is silicone oil used for common viscous coupling, and is filled in the space S1. The volume of the filler 45 expands with the generation of heat of the filler 45. However, the configuration of the frictional differential limiting element 4 is not limited to the above-described configuration, and for example, a general viscous coupling configuration can be adopted.

Next, the operation of the frictional differential limiting element 4 of the power transmission device 1 will be described. The differential between the rotational drive of the fourth gear 22d of the first transmission 22 and the rotational drive of the fourth gear 32d of the second transmission 32 causes the differential between the first clutch plate 41 and the second clutch plate 42 and the third clutch plate 44.

At this time, as the differential between the first clutch plate 41 and the second clutch plate 42 and the third clutch plate 44 increases, the filler 45 generates heat and expands in volume. Between the first clutch plate 41 and the third clutch plate 44 and between the second clutch plate 42 and the third clutch plate 44 are connected via a filler 45 so that the driving force can be transmitted. Thus, the power transmission device 1 limits the differential movement between the wheel 6 and the wheel 7.

As described above, the power transmission device 1 of the present embodiment limits the differential between the rotational drive of the first transmission 22 and the rotational drive of the second transmission 32 by using the frictional differential limiting element 4. That is, the power transmission device 1 of the present embodiment does not use a large-scale differential limiting element such as the power transmission device of JP-A-2008-283836, so that it is possible to realize miniaturization of the power transmission device as compared with the power transmission device of JP-A-2008-283836.

Moreover, by changing the temperature characteristics in which the filler 45 of the frictional differential limiting element 4 expands in volume, it is possible to easily adjust the rotational difference between the wheels 6 and the wheels 7 in which the frictional differential limiting element 4 operates, that is, the frictional force between the first clutch plate 41 and the second clutch plate 42 and the third clutch plate 44.

Embodiment 2

Figure 2:
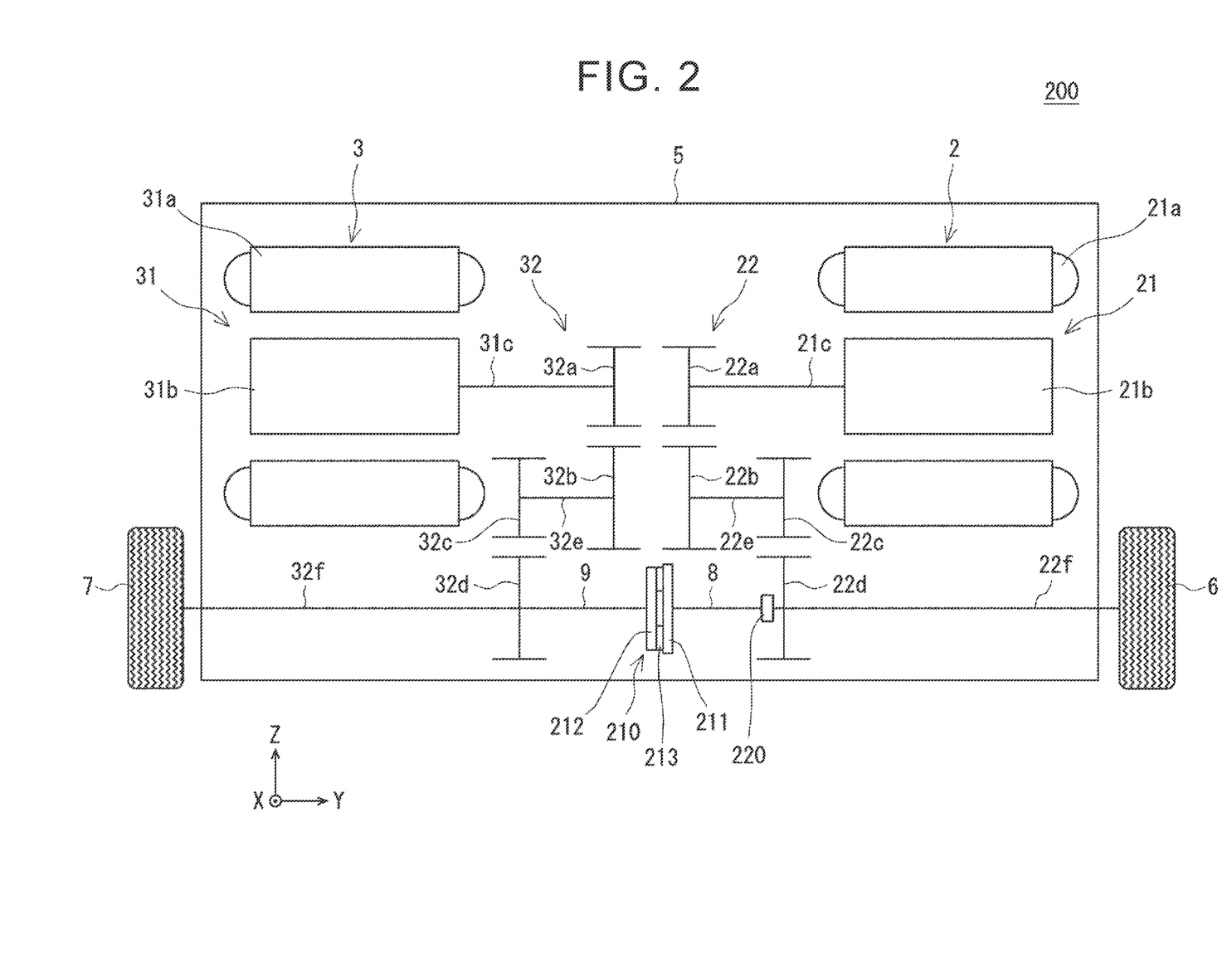
FIG. 2 is a diagram illustrating a power transmission device according to a second embodiment.
Figure 3:
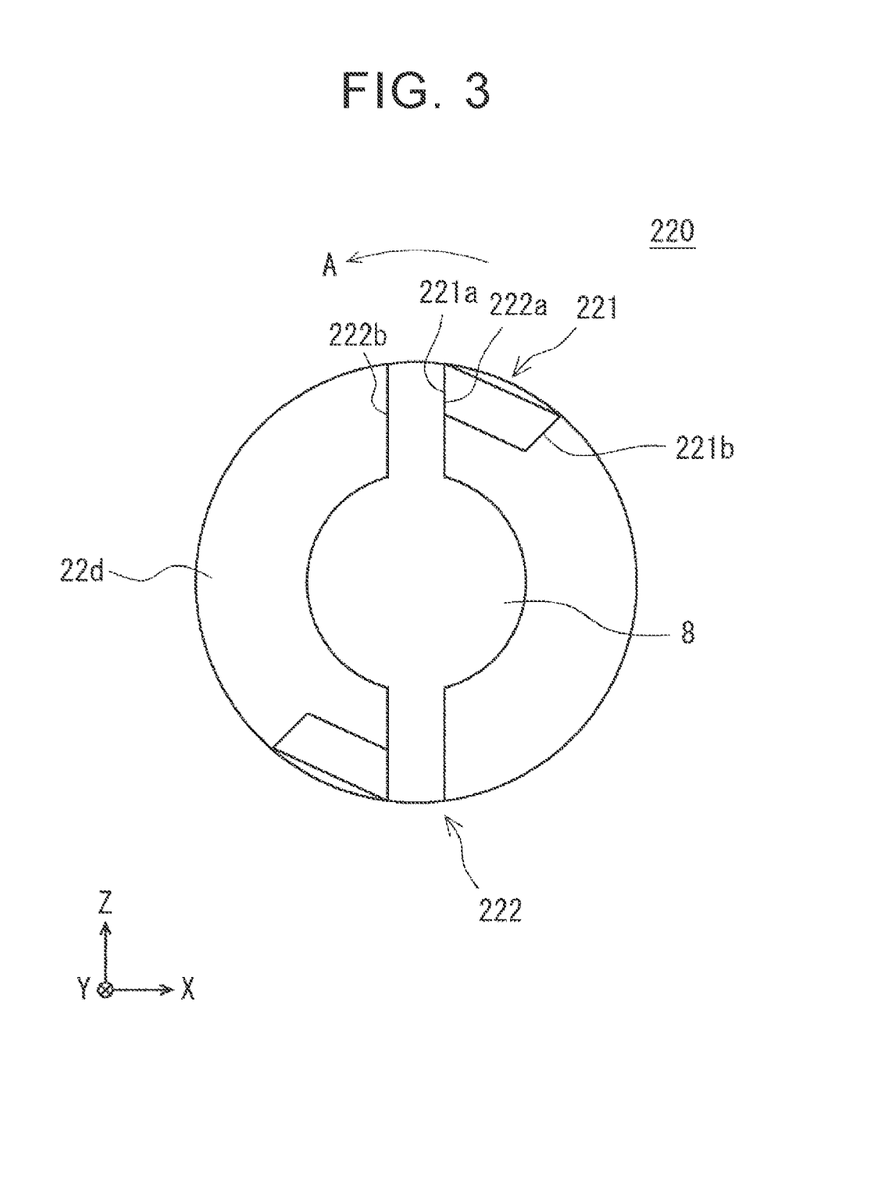
FIG. 3 is a view of the engagement portion between the fourth gear and the connecting shaft of the first transmission in the power transmission device according to the second embodiment, as viewed from the Y-axis-side.
Figure 4:
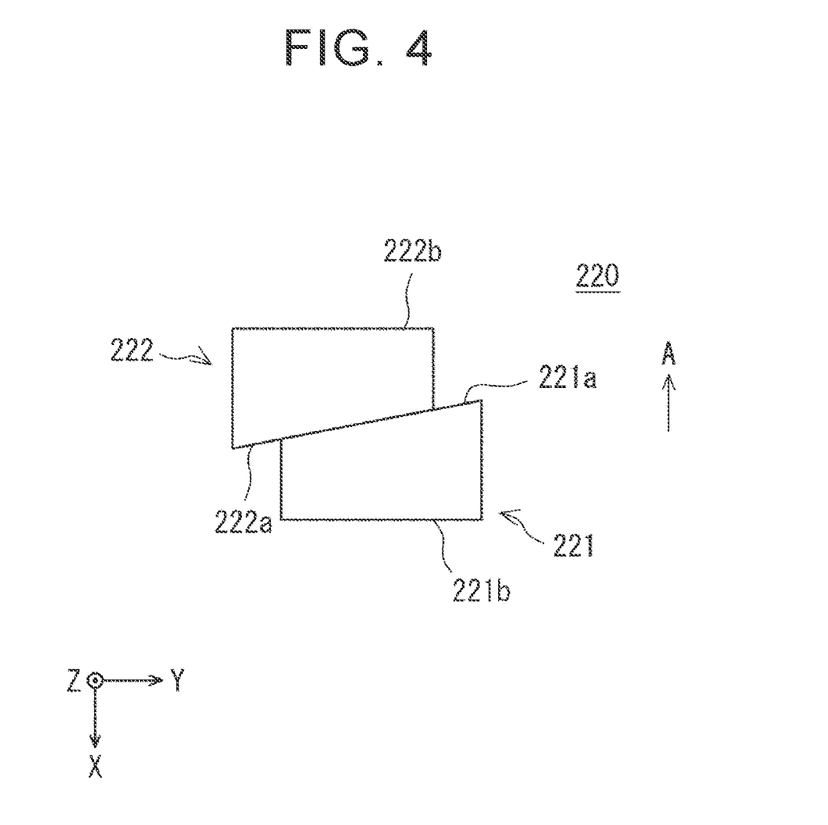
FIG. 4 is a diagram illustrating a relationship between a first protruding portion and a second protruding portion of an engagement portion between a fourth gear and a connecting shaft of the first transmission in the power transmission device according to the second embodiment.

FIG. 2 is a diagram illustrating the power transmission device of the present embodiment. FIG. 3 is a view of the engagement portion between the fourth gear and the connecting shaft of the first transmission in the power transmission device of the present embodiment as viewed from the Y-axis-side. FIG. 4 is a diagram illustrating a relationship between a first protruding portion and a second protruding portion of an engagement portion between a fourth gear and a connecting shaft of the first transmission in the power transmission device of the present embodiment. Note that FIGS. 3 and 4 schematically show the first protruding portion and the second protruding portion.

Note that the power transmission device 200 of the present embodiment has a configuration substantially equal to that of the power transmission device 1 of the first embodiment, and therefore, redundant description thereof will be omitted. The same members as those of the power transmission device 1 of the first embodiment will be described using the same reference numerals. In the power transmission device 200 of the present embodiment, the frictional differential limiting element 210 includes a first clutch plate 211, a second clutch plate 212, and a friction plate 213, as shown in FIG. 2.

For example, as shown in FIG. 2, the first clutch plate 211 has a disk shape substantially parallel to XZ plane. The first clutch plate 211 is connected to the fourth gear 22d of the first transmission 22 via the connecting shaft 8 so that the driving force can be transmitted. Therefore, the first clutch plate 211 rotates with the rotation of the connecting shaft 8.

As shown in FIG. 2, the second clutch plate 212 is, for example, a disk-shaped plate substantially parallel to XZ plane, and is disposed on the Y-axis-side with respect to the first clutch plate 211. The second clutch plate 212 is connected to the fourth gear 32d of the second transmission 32 via the connecting shaft 9 so that the driving force can be transmitted. Therefore, the second clutch plate 212 rotates with the rotation of the connecting shaft 9.

At this time, the Y-axis-side end portion of the connecting shaft 9 is fixed to, for example, the fourth gear 32d of the second transmission 32, and is substantially restricted from moving in the Y-axis direction. As shown in FIG. 2, the friction plate 213 is, for example, an annular plate substantially parallel to XZ plane, and is disposed between the first clutch plate 211 and the second clutch plate 212.

Such a frictional differential limiting element 210 is actuated by, for example, a rotational drive of the wheel 6 when the wheel 6 is rotated forward. Specifically, as shown in FIG. 2, the power transmission device 200 includes an engagement portion 220 between the fourth gear 22d of the first transmission 22 and the connecting shaft 8. As illustrated in FIGS. 3 and 4, the engagement portion 220 includes a first protruding portion 221 and a second protruding portion 222.

As shown in FIG. 3, the first protruding portion 221 protrudes from the fourth gear 22d of the first transmission 22 toward the Y-axis-side. The first protruding portions 221 are arranged at substantially equal intervals in the circumferential direction of the fourth gear 22d about the rotational axis of the fourth gear 22d when viewed from the Y-axis direction.

As shown in FIGS. 3 and 4, the first protruding portion 221 has a substantially rectangular block-like shape, and is formed on an inclined surface whose first surface 221a on the side of the fourth gear 22d in the forward rotation of the wheel 6 in the first protruding portion 221 is inclined toward the rotation direction of the fourth gear 22d toward the Y-axis+side (that is, the side of the wheel 6). On the other hand, the second surface 221b of the first protruding portion 221, which is opposite to the rotational direction of the fourth gear 22d when the wheels 6 are rotated forward, is a flat surface substantially parallel to the Y-axis.

For example, as shown in FIG. 3, the second protruding portion 222 protrudes radially outward of the connecting shaft 8 from an end portion of the connecting shaft 8 on the Y-axis+-side. The second protruding portions 222 are arranged at substantially equal intervals in the circumferential direction of the connecting shaft 8 about the rotation axis of the connecting shaft 8 when viewed from the Y-axis direction. At this time, while the end portion of the connecting shaft 8 on the Y-axis+side is inserted into the plurality of first protruding portions 221 arranged in the circumferential direction of the fourth gear 22d, the second protruding portion 222 is disposed between the first protruding portions 221. Therefore, the Y-axis+-side end portion of the connecting shaft 8 is not fixed to the fourth gear 22d of the first transmission 22. The connecting shaft 8 is movable in the Y-axis direction.

As shown in FIGS. 3 and 4, the second protruding portion 222 has a substantially rectangular block-like shape, and is formed in a rotational direction of the connecting shaft 8 when the wheel 6 in the second protruding portion 222 rotates forward, in other words, an inclined surface in which the first surface 222a on the opposite side to the rotational direction of the fourth gear 22d inclines toward the rotational direction of the connecting shaft 8 as it goes toward the Y-axis+. On the other hand, the second surface 222b of the second protruding portion 222 on the rotational direction of the connecting shaft 8 when the wheel 6 is rotated forward is a flat surface substantially parallel to the Y-axis.

At this time, the first surface 221a of the first protruding portion 221 and the first surface 222a of the second protruding portion 222 can be substantially surface-contacted, and the second surface 221b of the first protruding portion 221 and the second surface 222b of the second protruding portion 222 can be substantially surface-contacted.

In such a power transmission device 200, for example, when the wheel 6 and the wheel 7 are rotating forward, the first surface 221a of the first protruding portion 221 is in substantially surface contact with the first surface 222a of the second protruding portion 222 disposed on the rotational side of the fourth gear 22d when the wheel 6 is rotating forward with respect to the first protruding portion 221, and pushes the second protruding portion 222.

At this time, the first surface 221a of the first protruding portion 221 and the first surface 222a of the second protruding portion 222 are formed as inclined surfaces inclined toward the rotational direction of the fourth gear 22d of the first transmission 22 toward the Y-axis+. That is, the contact surface between the first surface 221a of the first protruding portion 221 and the first surface 222a of the second protruding portion 222 is an inclined surface inclined toward the rotational direction of the fourth gear 22d of the first transmission 22 toward the Y-axis+.

Therefore, when the first surface 221a of the first protruding portion 221 pushes the first surface 222a of the second protruding portion 222, a force is generated toward the Y-axis-side, and the connecting shaft 8 is pushed toward the Y-axis-side. Accordingly, the first clutch plate 211 is pushed into the second clutch plate 212 via the friction plate 213. As a result, the frictional differential limiting element 210 is actuated to limit the differential between the wheel 6 and the wheel 7.

On the other hand, in the power transmission device 200, for example, when the wheel 6 and the wheel 7 are rotating backward, the second surface 221b of the first protruding portion 221 is in substantially surface contact with the second surface 222b of the second protruding portion 222 disposed on the rotational side of the fourth gear 22d when the wheel 6 is rotating backward with respect to the first protruding portion 221, and pushes the second protruding portion 222.

At this time, the second surface 221b of the first protruding portion 221 and the second surface 222b of the second protruding portion 222 are arranged substantially parallel to the Y-axis. That is, the contacting surface between the second surface 221b of the first protruding portion 221 and the second surface 222b of the second protruding portion 222 is substantially parallel to the Y-axis. Therefore, even if the second surface 221b of the first protruding portion 221 pushes the second surface 222b of the second protruding portion 222, a force in the Y-axis direction is not generated. As a result, the frictional differential limiting element 210 is not actuated, and differential movement between the wheel 6 and the wheel 7 is allowed.

As described above, the power transmission device 200 can operate the frictional differential limiting element 210 with a simple configuration of the engagement portion 220 using the first protruding portion 221 and the second protruding portion 222. Moreover, since the power transmission device 200 uses the frictional differential limiting element 210 in the same manner as the power transmission device 1 of the first embodiment, it is possible to realize miniaturization of the power transmission device as compared with the power transmission device of JP-A-2008-283836.

Further, by adjusting the inclination angle of the contact surface between the first surface 221a of the first protruding portion 221 and the first surface 222a of the second protruding portion 222 with respect to the Y-axis, the frictional force between the first clutch plate 211 and the second clutch plate 212 can be easily adjusted.

In the present embodiment, the engagement portion 220 is provided between the fourth gear 22d of the first transmission 22 and the connecting shaft 8, but the engagement portion may be disposed between the fourth gear 32d of the second transmission 32 and the connecting shaft 9. At this time, the engagement portion 220 may be omitted. The engagement portion between the fourth gear 32d and the connecting shaft 9 of the second transmission 32 may have a line-symmetrical configuration in which the axis extending in the Z-axis direction is an axis of symmetry with respect to the engagement portion 220.

Embodiment 3

Figure 5:
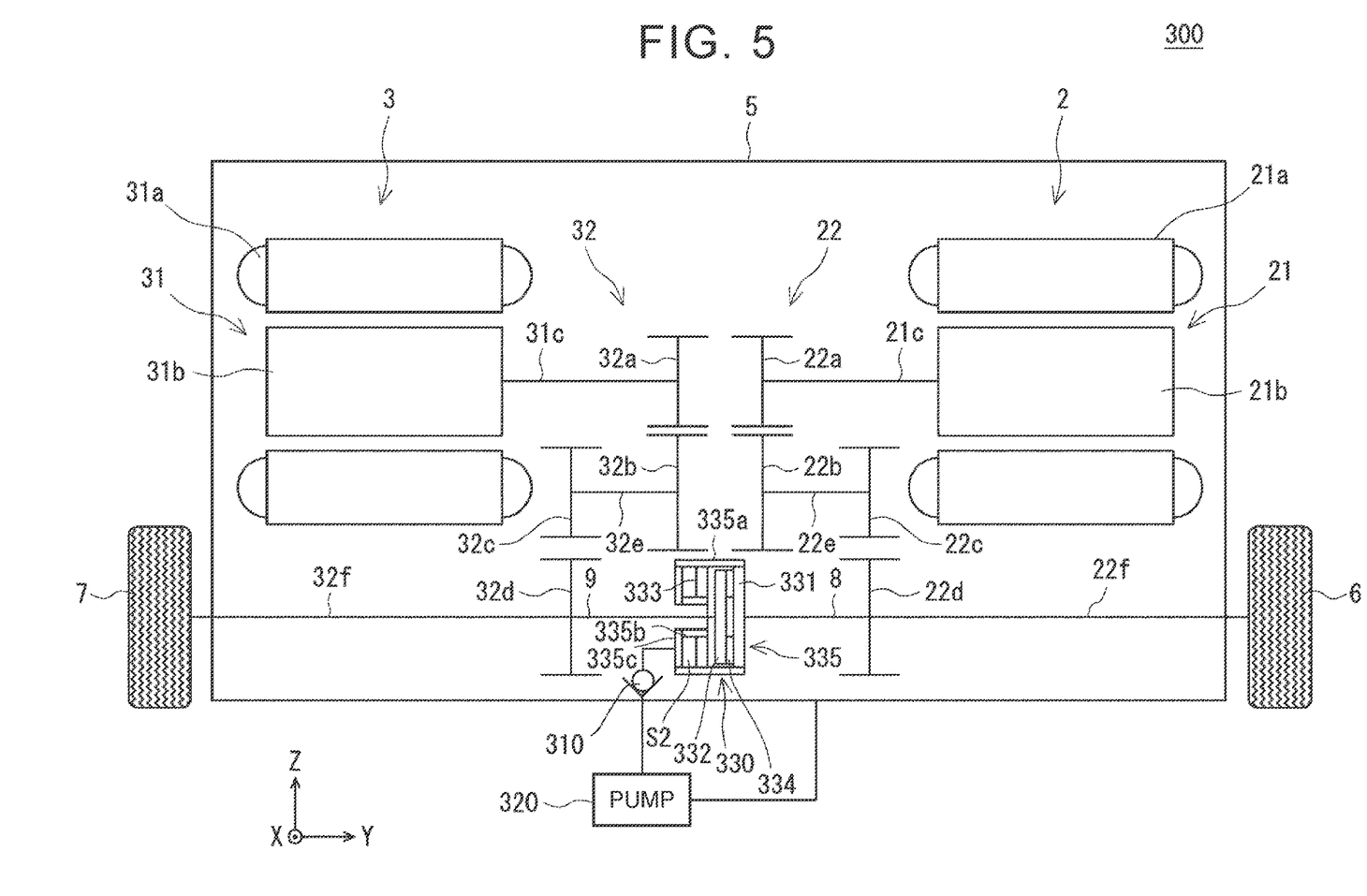
FIG. 5 is a diagram illustrating a power transmission device according to a third embodiment.

FIG. 5 is a diagram illustrating the power transmission device of the present embodiment. As shown in FIG. 5, the power transmission device 300 of the present embodiment has a configuration substantially equal to that of the power transmission device 1 of the first embodiment, and therefore, redundant description thereof will be omitted. The same members as those of the power transmission device 1 of the first embodiment will be described using the same reference numerals.

In the power transmission device 300 of the present embodiment, as shown in FIG. 5, a cooling medium such as oil is supplied from the pump 320 into the housing 5 via the check valve 310, and the inside of the housing 5 is filled with the cooling medium. The frictional differential limiting element 330 is configured to operate by using a cooling medium filled in the housing 5 as a pressure medium.

As shown in FIG. 5, the frictional differential limiting element 330 includes a first clutch plate 331, a second clutch plate 332, a piston 333, a friction plate 334, and a housing 335.

For example, as shown in FIG. 5, the first clutch plate 331 has a disk shape substantially parallel to XZ plane. The first clutch plate 331 is connected to the fourth gear 22d of the first transmission 22 via the connecting shaft 8 so that the driving force can be transmitted. At this time, for example, the end portion of the connecting shaft 8 on the Y-axis+-side is fixed to the fourth gear 22d of the first transmission 22, and the connecting shaft 8 is restrained from moving in the Y-axis direction.

As shown in FIG. 5, the second clutch plate 332 is, for example, a disk-shaped plate substantially parallel to XZ plane, and is disposed on the Y-axis-side with respect to the first clutch plate 331. The second clutch plate 332 is connected to the fourth gear 32d of the second transmission 32 via the connecting shaft 9 so that the driving force can be transmitted. At this time, the connecting shaft 9 and the fourth gear 32d of the second transmission 32 are spline-connected, for example, and the connecting shaft 9 is allowed to move in the Y-axis direction.

For example, as shown in FIG. 5, the piston 333 has an annular plate shape substantially parallel to XZ plane, and is disposed on the Y-axis-side with respect to the second clutch plate 332. The friction plate 334 has, for example, an annular plate shape substantially parallel to XZ plane, and is disposed between the first clutch plate 331 and the second clutch plate 332.

As illustrated in FIG. 5, the housing 335 includes, for example, a first cylindrical portion 335a, a second cylindrical portion 335b, and an annular portion 335c, and is a substantially sealed space. The first cylindrical portion 335a has, for example, a cylindrical shape extending in the Y-axis direction, and covers the first clutch plate 331, the second clutch plate 332, the piston 333, and the friction plate 334.

The Y-axis+-side end portion of the first cylindrical portion 335a is fixed to the peripheral edge portion of the first clutch plate 331.

The second cylindrical portion 335b has, for example, a cylindrical shape extending in the Y-axis direction as shown in FIG. 5, and has a small diameter with respect to the first cylindrical portion 335a. The second cylindrical portion 335b is disposed in the hollow portion of the first cylindrical portion 335a, and the connecting shaft 9 is passed through the hollow portion of the second cylindrical portion 335b. A piston 333 is disposed between the first cylindrical portion 335a and the second cylindrical portion 335b so as to be movable in the Y-axis direction.

As shown in FIG. 5, the annular portion 335c has, for example, a substantially annular plate-like shape substantially parallel to XZ plane. An end portion of the first cylindrical portion 335a on the Y-axis-side is fixed to an outer peripheral edge portion of the annular portion 335c, and an end portion of the second cylindrical portion 335b on the Y-axis-side is fixed to an inner peripheral edge portion of the annular portion 335c.

At this time, the space S2 surrounded by the first cylindrical portion 335a, the annular portion 335c, the second cylindrical portion 335b, and the piston 333 is a substantially sealed space, and the space S2 and the inside of the housing 5 communicate with each other. That is, although not shown, the housing 335 is formed with a communication portion that communicates the inside of the housing 5 with the space S2.

Therefore, the cooling medium in the housing 5 enters the space S2, and the pressure of the cooling medium in the space S2 is substantially equal to the pressure of the cooling medium in the housing 5. In the frictional differential limiting element 330, the piston 333 is pushed into the second clutch plate 332 by the pressure of the coolant in the space S2.

As a result, the second clutch plate 332 pushes the first clutch plate 331 through the friction plate 334, and as a result, the frictional differential limiting element 330 is actuated to limit the differential between the wheel 6 and the wheel 7.

In such a power transmission device 300, the frictional differential limiting element 330 may constantly push the second clutch plate 332 into the first clutch plate 331 using the cooling medium filled in the housing 5. Accordingly, even if the first clutch plate 331, the second clutch plate 332, or the like is worn, the frictional differential limiting element 330 can be maintained in the operating state at all times.

Although the pressure of the cooling medium in the housing 5 and the pressure of the cooling medium in the space S2 of the frictional differential limiting element 330 are substantially equal to each other by communicating the inside of the housing 5 and the space S2 of the frictional differential limiting element 330, for example, a path for supplying the cooling medium into the housing 5 and a path for supplying the pressure medium such as oil to the space S2 of the frictional differential limiting element 330 may be separated, and the pressure of the pressure medium in the space S2 of the frictional differential limiting element 330 may be individually controlled.

Figure 6:
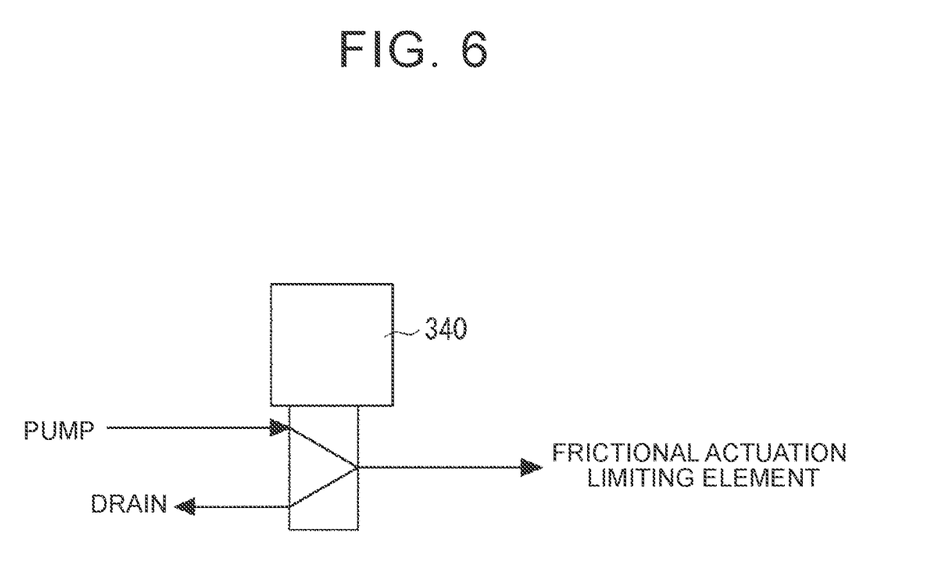
FIG. 6 is a diagram illustrating a solenoid valve used in a power transmission device.

Here, the solenoid valve 340 shown in FIG. 6 may be arranged in a path for supplying the pressurized medium to the space S2 of the frictional differential limiting element 330. Thus, the frictional force between the first clutch plate 331 and the second clutch plate 332 can be easily adjusted.

Embodiment 4

Figure 7:
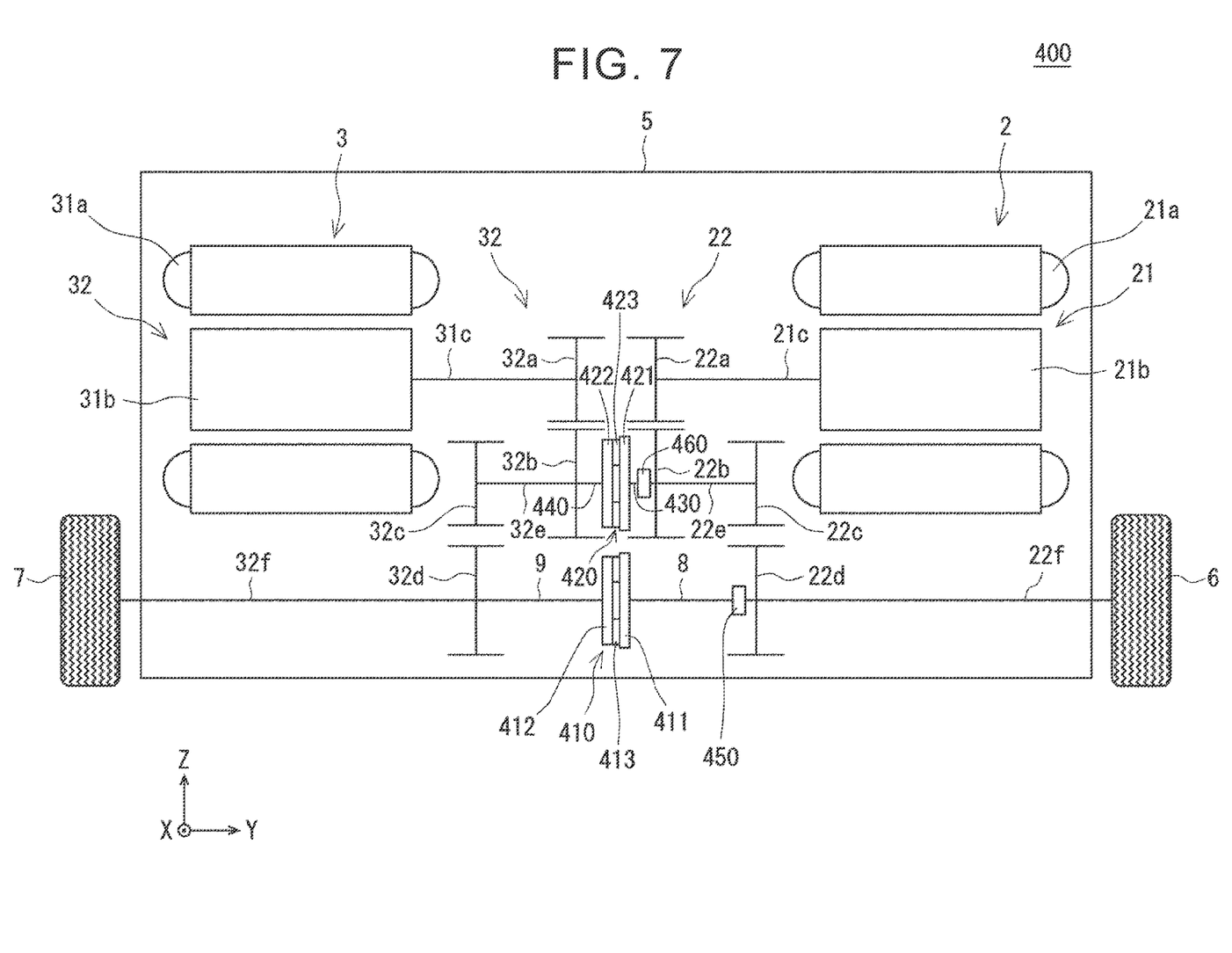
FIG. 7 is a diagram illustrating a power transmission device according to a fourth embodiment.

FIG. 7 is a diagram illustrating the power transmission device of the present embodiment. As shown in FIG. 7, the power transmission device 400 of the present embodiment has a configuration substantially equal to that of the power transmission device 200 of the second embodiment, and therefore, redundant description thereof will be omitted. The same members as those of the power transmission device 200 of the second embodiment will be described using the same reference numerals.

The power transmission device 400 of the present embodiment includes, for example, a first frictional differential limiting element 410 disposed between the fourth gear 22d of the first transmission 22 and the fourth gear 32d of the second transmission 32, and a second frictional differential limiting element 420 disposed between the second gear 22b of the first transmission 22 and the second gear 32b of the second transmission 32.

As the first frictional differential limiting element 410 and the second frictional differential limiting element 420, for example, the frictional differential limiting element 210 of the second embodiment can be used. That is, the first frictional differential limiting element 410 includes a first clutch plate 411 connected to the fourth gear 22d of the first transmission 22 via the connecting shaft 8 so as to transmit the driving force, a second clutch plate 412 connected to the fourth gear 32d of the second transmission 32 via the connecting shaft 9 so as to transmit the driving force, and a friction plate 413 disposed between the first clutch plate 411 and the second clutch plate 412.

The second frictional differential limiting element 420 includes a first clutch plate 421 connected to the second gear 22b of the first transmission 22 via the connecting shaft 430 so as to transmit a driving force, a second clutch plate 422 connected to the second gear 32b of the second transmission 32 via the connecting shaft 440 so as to transmit a driving force, and a friction plate 423 disposed between the first clutch plate 421 and the second clutch plate 422.

The first engagement portion 450 is disposed between the fourth gear 22d of the first transmission 22 and the connecting shaft 8, and the second engagement portion 460 is also disposed between the second gear 22b of the first transmission 22 and the connecting shaft 430. The first engagement portion 450 and the second engagement portion 460 have substantially the same configuration as the engagement portion 220 of the second embodiment.

Here, by making the inclination angle of the contact surface between the first surface of the first protruding portion and the first surface of the second protruding portion in the first engagement portion 450 with respect to the Y-axis and the inclination angle of the contact surface between the first surface of the first protruding portion and the first surface of the second protruding portion in the second engagement portion 460 with respect to the Y-axis, the operating characteristics (that is, the frictional force between the first clutch plate and the second clutch plate) of the first frictional differential limiting element 410 and the second frictional differential limiting element 420 can be made different.

In the present embodiment, the first engagement portion 450 between the fourth gear 22d and the connecting shaft 8 of the first transmission 22, and a second engagement portion 460 between the second gear 22b and the connecting shaft 430 of the first transmission 22, the fourth gear 32d and the connecting shaft 9 of the second transmission 32, or may include an engagement portion between the second gear 32b and the connecting shaft 440 of the second transmission 32.

Further, in the present embodiment, the first clutch plate is pushed into the second clutch plate by the contact between the first surface of the first protruding portion and the first surface of the second protruding portion in the engagement portion to actuate the frictional differential limiting element, but, for example, by individually controlling the operation of the first clutch plate of the first frictional differential limiting element 410 and the operation of the first clutch plate of the second frictional differential limiting element 420 by the pressure medium, for example, the first frictional differential limiting element 410 may be actuated during the power action of the power transmission device 400 and the second frictional differential limiting element 420 may be actuated during the regeneration of the power transmission device 400.

The present disclosure is not limited to the above-described embodiments, and can be appropriately modified without departing from the spirit thereof. For example, the frictional differential limiting element of the above-described embodiment is an example, and may be configured to be operated by a friction force between the first clutch plate and the second clutch plate. In addition, an operation source for generating a frictional force between the first clutch plate and the second clutch plate is not limited. For example, the power transmission device of the above-described embodiment is configured as a power transmission device of a vehicle, but the power transmission device can be applied to a power transmission device such as a plant, and is not limited thereto.

What is claimed is:

1. A power transmission device comprising:
a first drive unit that includes a first drive source and a first transmission connected to the first drive source such that a drive force is transmitted;
a second drive unit that includes a second drive source and a second transmission connected to the second drive source such that a drive force is transmitted, and that is arranged in parallel with the first drive unit;
a first frictional differential limiting element that is disposed between the first transmission and the second transmission and that limits a differential between a rotational drive of the first transmission and a rotational drive of the second transmission;
a first protruding portion provided on a gear of the first transmission; and
a second protruding portion that is provided on a first connecting shaft, and that comes into contact with the first protruding portion and transmits a drive force of the gear to the first connecting shaft when the gear rotates, wherein
the first frictional differential limiting element includes,
 a first clutch plate connected to the first connecting shaft such that a drive force is transmitted, the first connecting shaft being connected such that a drive force is transmitted between the first transmission and the first frictional differential limiting element, and
 a second clutch plate connected to a second connecting shaft such that a drive force is transmitted, the second connecting shaft being connected such that a drive force is transmitted between the second transmission and the first frictional differential limiting element,
the first frictional differential limiting element changes a contact force between the first clutch plate and the second clutch plate, based on an axial force acting on the first connecting shaft, and
a contact surface between the first protruding portion and the second protruding portion when the gear rotates to one side includes an inclined surface inclined to a side of a rotation direction of the gear to the one side as the inclined surface extends toward a side of the first drive unit in an axial direction of the first connecting shaft.

2. The power transmission device according to claim 1, wherein the first frictional differential limiting element includes a viscous coupling.

3. A power transmission device comprising: a first drive unit that includes a first drive source and a first transmission connected to the first drive source such that a drive force is transmitted;
a second drive unit that includes a second drive source and a second transmission connected to the second drive source such that a drive force is transmitted, and that is arranged in parallel with the first drive unit;
a first frictional differential limiting element that is disposed between the first transmission and the second transmission and that limits a differential between a rotational drive of the first transmission and a rotational drive of the second transmission;
a first protruding portion provided on a gear of the first transmission; and
a second protruding portion that is provided on a first connecting shaft, and that comes into contact with the first protruding portion and transmits a drive force of the gear to the first connecting shaft when the gear rotates, wherein
the first frictional differential limiting element includes,
 a first clutch plate connected to the first connecting shaft such that a drive force is transmitted, the first connecting shaft being connected such that a drive force is transmitted between the first transmission and the first frictional differential limiting element, and
 a second clutch plate connected to a second connecting shaft such that a drive force is transmitted, the second connecting shaft being connected such that a drive force is transmitted between the second transmission and the first frictional differential limiting element,
the first frictional differential limiting element changes a contact force between the first clutch plate and the second clutch plate, based on an axial force acting on the first connecting shaft,
a contact surface between the first protruding portion and the second protruding portion when the gear rotates to one side includes an inclined surface inclined to a side of a rotation direction of the gear to the one side as the inclined surface extends toward a side of the first drive unit in an axial direction of the first connecting shaft, and
a contact surface between the first protruding portion and the second protruding portion when the gear rotates to another side includes a surface parallel to the axial direction of the first connecting shaft.

4. A power transmission device comprising:
a first drive unit that includes a first drive source and a first transmission connected to the first drive source such that a drive force is transmitted;
a second drive unit that includes a second drive source and a second transmission connected to the second drive source such that a drive force is transmitted, and that is arranged in parallel with the first drive unit;
a first frictional differential limiting element that is disposed between the first transmission and the second transmission and that limits a differential between a rotational drive of the first transmission and a rotational drive of the second transmission; and a second frictional differential limiting element disposed at a place that is between the first transmission and the second transmission and that is different from a place of the first frictional differential limiting element, in which the second frictional differential limiting element limits the differential between the rotational drive of the first transmission and the rotational drive of the second transmission.

* * * * *